United States Patent [19]
Mason

[11] Patent Number: 4,725,042
[45] Date of Patent: Feb. 16, 1988

[54] BALL VALVE ASSEMBLY

[75] Inventor: Jimmie L. Mason, Crestline, Calif.

[73] Assignee: Mace Corporation, Upland, Calif.

[21] Appl. No.: 847,363

[22] Filed: Apr. 2, 1986

[51] Int. Cl.⁴ ............................................. F16K 5/00
[52] U.S. Cl. .................................. 251/315; 251/288; 251/362
[58] Field of Search ............... 251/314, 315, 171, 288, 251/362

[56] References Cited

U.S. PATENT DOCUMENTS

| | | | |
|---|---|---|---|
| 11,431 | 7/1894 | Glauber | 251/288 |
| 3,384,341 | 7/1968 | Ripert | 251/315 |
| 3,610,575 | 10/1971 | Yoneda | 251/315 |
| 4,163,544 | 8/1979 | Fowler et al. | 251/315 |
| 4,411,407 | 10/1983 | Ninomiya et al. | 251/315 |
| 4,483,513 | 11/1984 | Summers | 251/315 |
| 4,546,790 | 10/1985 | Huber et al. | 251/315 |

Primary Examiner—Harold W. Weakley
Attorney, Agent, or Firm—Flynn, Thiel, Boutell & Tanis

[57] ABSTRACT

A ball valve assembly employing valve seats which are constructed of teflon and form part of end seal members, with the teflon valve seats being of a thin and deformable arrangement backed by an elastic loading ring which is isolated from the liquid. The valve ball is floatingly mounted between the opposed valve seats so that the ball automatically centers itself onto the opposed valve seats to ensure a proper sealing engagement therewith.

17 Claims, 6 Drawing Figures

BALL VALVE ASSEMBLY

FIELD OF THE INVENTION

This invention relates to an improved ball valve assembly for use with high temperature and/or corrosive liquids, and for use in situations involving flow of different fluid without causing cross contamination.

BACKGROUND OF THE INVENTION

The chemical and semi-conductor industries have long been faced with the demand for valving arrangements capable of withstanding contact with corrosive chemicals. These industries require components which can not only withstand exposure to corrosive liquids at significantly higher temperatures, but the valving arrangements must also be of larger size so as to have the capacity for permitting greater flow therethrough.

At the present time, most valve assemblies for use in these environments utilize valve components constructed of synthetic materials such as teflon. While the basic components are suitable for exposure to these environments, nevertheless the conventional weakness of these valve assemblies is the valve seat. These assemblies typically employ a valve seat formed by an elastomeric ring in order to obtain the desired sealing and sliding engagement between the valve seat and the movable valve member such as a ball. These elastomeric valve seat rings, however, tend to deteriorate when exposed to high temperature corrosive liquids, and hence the sealing characteristics of the valve deteriorate so as to require shutdown and repair.

Another problem encountered with valves of this type occurs in those use applications where the same system is used for controlling flow of different fluids at different times. For example, in systems employing a batch-type operation, one fluid may be pumped through the system for a selected period of time, with the system thereafter being flushed out, following which a different fluid will be pumped through the system. In such use environments, particularly when using fluids requiring careful isolation or separation such as dionized water or other pure fluids, it is extremely important that the valve be capable of handling these different fluids without causing cross-contamination. In valves which employ conventional elastomeric seat rings, however, it has been discovered that such cross-contamination is possible. These elastomeric seat rings have limited porosity, and some of the liquid becomes trapped in the pores of the seat rings, which trapped liquid cannot be readily cleansed. Hence, when the system is switched over for use with a different liquid, some of the trapped liquid gradually leaks into the pure liquid and causes undesired contamination thereof.

Accordingly, it is an object of the present invention to provide an improved valve assembly, specifically a ball valve assembly, which can successfully overcome or at least greatly minimize the problems associated with prior art devices as explained above.

More specifically, the improved valve assembly of the present invention employs valve seats which are constructed of teflon and form part of an end seal member, with the teflon valve seats being of a thin and hence deformable arrangement backed by an elastic loading ring which is isolated from the liquid. The teflon valve seat hence can readily withstand exposure to the high temperature corrosive liquids without undergoing deterioration, and at the same time the teflon valve seat is nonporous so as to prevent cross-contamination problems. Since the elastic loading ring which backs the teflon valve seat is isolated from the liquid, it is not subjected to deterioration or cross-contamination problems. This improved ball valve assembly hence is particularly suitable for use with extremely pure and/or high temperature corrosive liquids.

Another advantage of the improved ball valve assembly of this invention, as aforesaid, is the manner in which the valve ball is floatingly mounted between the opposed valve seats so that the ball automatically centers itself onto the opposed valve seats so as to ensure a proper sealing engagement therewith, irrespective of manufacturing or operational variations. This also permits the valve ball to continue to maintain a proper center and sealed seating engagement with the valve seats, even after repeated numbers of operations, since the centering characteristic of the valve ball and the resilient backing of the teflon valve seats wholly compensates for incidental wear which may occur through repeated use of the valve assembly.

The improved ball valve assembly of the present invention includes a housing having a flow passage therethrough, and a valve ball movably positioned centrally of this flow passage. The valve ball can be rotated through an angle of substantially 90° between an open position wherein an opening through the valve ball is aligned with the passage, and a closed position wherein the valve ball opening extends transversely of the passage. The housing mounts a substantially identical end seal member within each end of the passage for cooperation with one side of the valve ball. The end seal member is of a sleevelike construction and is formed from a nonporous chemically-inert material such as teflon. The end seal member has a sleeve part which fits within the end of the passage and defines a port which opens toward the valve ball. The end seal member, on the axially inner end thereof, has an annular mounting part of a blocklike cross section, which part is clampingly held within the housing, such as between the center and end parts of the housing. The sleeve and mounting parts of the end seal member are axially joined together by an annular bridging portion which is of a thin and somewhat flexible wall. This bridging portion is surrounded by an annular groove which separates the sleeve and mounting parts. A rigid retainer ring is disposed within this annular groove adjacent the outer part thereof for creating a substantially rigid axial backing between the sleeve and mounting parts, and this retainer ring externally surrounds a resilient or elastic seat loading ring which is confined within the inner end of the annular groove. This seat loading ring acts against the thin wall of the annular bridging portion, the latter having a curved corner which defines an annular seat for engagement with the valve ball. The loading ring resiliently urges this annular seat outwardly for snug sliding but sealing engagement with the adjacent side of the valve wall.

In the improved ball valve assembly, as aforesaid, the ball has the capability of moving transversely relative to the longitudinal axis of the valve stem, and the ball and stem combination can itself move transversely relative to the flow passage, whereby the ball is floatably mounted solely by the opposed seats.

Other objects and purposes of the invention will be apparent to persons familiar with arrangements of this general type upon reading the following specification and inspecting the accompanying drawings.

Figure 1:
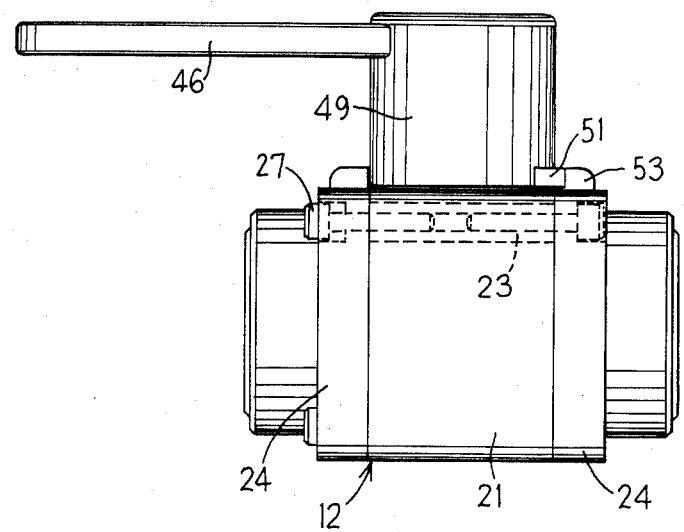
FIG. 1 is a side view of the improved ball valve assembly of the present invention.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the valve assembly and designated parts thereof. Said terminology will include the words specifically mentioned, derivatives thereof, and words of similar import.

DETAILED DESCRIPTION

Referring to the drawings, there is illustrated an improved ball valve assembly 11 according to the present invention. This assembly includes a housing 12 in which is movably positioned a valve member 13 for controlling flow of liquid through a passage 14. The valve member 13 is suitably movably controlled by an actuator 16 which angularly displaces the valve member between open and closed positions.

The housing 12 includes a main or central body 21 which, in cross section, is of a substantially square configuration, with this body having a substantially cylindrical chamber 22 extending centrally therethrough. The corner portions of this central body 21 have small openings extending coaxially through the body, with these openings mounting metal cylindrical spacer members 23 therein, which spacer members 23 are internally threaded from the opposite ends thereof.

Housing 12 also includes a pair of annular end members or retainers 24 which are fixedly secured to the opposite end faces of the central body 21. Each of these end members 24 has a substantially cylindrical passage 26 therethrough which is coaxially aligned with the cylindrical chamber 22 of the central body. A plurality of threaded fasteners 27 extend through the corner portions of the end member 24 and threadably engage the respective cylindrical spacers 23 for fixedly and snugly securing the end member 24 to the respective end face of the central body 21.

The central body 21 also includes an externally threaded substantially cylindrical stem part 28 which is an integral part of the side wall of the central body 21, with this stem part 28 projecting radially outwardly away from the body part. This externally threaded stem part 28 defines a cylindrical opening 29 which projects coaxially therethrough for communication with the cylindrical chamber 22, with the longitudinal axis of this opening 29 extending perpendicular and intersecting relationship to the longitudinal axis of the cylindrical chamber 22.

Figure 2:
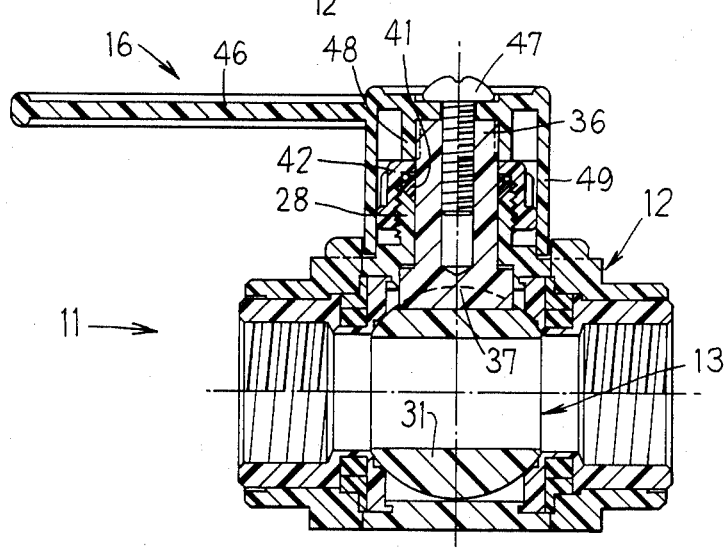
FIG. 2 is a central cross-sectional view.
Figure 3:
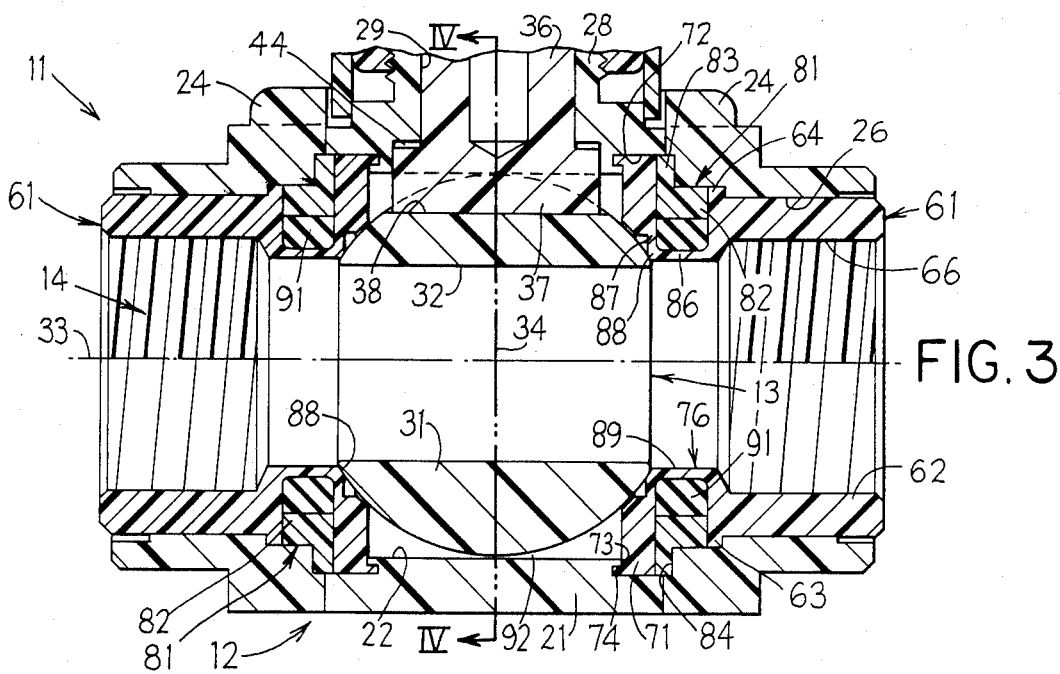
FIG. 3 is a fragmentary cross-sectional view showing parts thereof from FIG. 2 on an enlarged scale.

Considering now the valve member 13, it is composed primarily by a ball member 31 of spherical configuration, which ball member 31 has a central flow passage 32 extending therethrough, this flow passage being oriented so that its axis 33 passes through the center of the ball member and is aligned with the central longitudinal axis 33 of passage 14 when the valve member is in the open position illustrated by FIGS. 2 and 3.

The ball member 31 is controlled for movement between open and closed positions due to angular or rotational movement of the ball member substantially about the perpendicular axis 34 which also extends through the center of the ball and substantially perpendicularly intersects the axis 33. This axis 34, when the ball member is perfectly centered in the housing, is aligned with the longitudinal central axis of the housing stem part 28.

Figure 4:
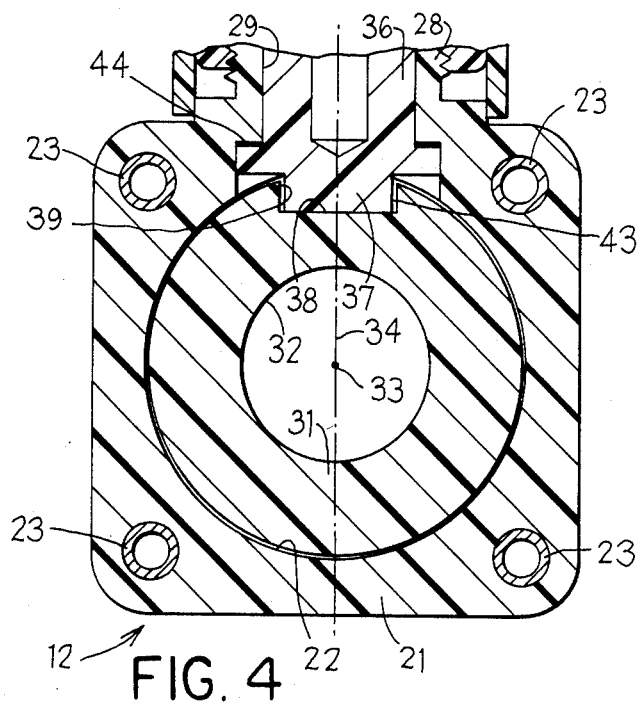
FIG. 4 is a sectional view taken substantially along line IV—IV of FIG. 3.

The valve member 13 also includes a radially outwardly projecting stem 36 which is of a substantially cylindrical construction and is rotatably supported within the opening 29 defined by the stem part 28. This cylindrical stem 36, adjacent the radially inner end thereof, has a part 37 which resembles a block in that it is substantially rectangular in cross section. This blocklike part 37 functions substantially as a slide in that it is slidably accommodated within a channellike groove 38 which is formed in the surface of the ball member 31. This groove 38 is elongated in a direction parallel with the flow passage 32, and the blocklike part 37 is slidably accommodated between the parallel side walls 39 (FIG. 4) of the groove, 38 so that the ball member 31 and cylindrical stem 36 can be relatively slidably displaced through a small extent with respect to one another in a direction generally parallel with the longitudinal axis of the flow opening 32. Further, the transverse or width dimension of the blocklike part 37 is slightly less than the width of the groove 38 as defined between the side walls 39 thereof, thereby leaving a sufficient but small clearance 43 therebetween so as to also permit transverse displacement of the ball member 31 sidewardly or transversely relative to the block 37. The ball member 31 and the cylindrical stem 36 in their entirety can also be moved transversely substantially in the direction of the axis 34 as permitted by the small clearance 44. Hence, the ball 31 is thus supported for limited transverse displacement in three perpendicular directions, and hence the ball is supported in a wholly floating manner, by the opposed valve seats, as explained hereinafter, so as to provide a proper sealing and seating engagement.

The outwardly projecting end of the cylindrical stem 36 is sealed with respect to the stem part 28 by means of a tapered annular packing 41 being interposed therebetween, this packing preferably being a wedge-shaped member in cross section constructed of teflon. The packing is wedgingly and sealingly engaged between the stem 36 and stem part 28 by means of a packing nut 42 which axially compresses the packing downwardly, with the stem nut being externally threaded onto the stem part 28.

The projecting valve stem 36, at its outer end, is appropriately secured to the actuator 16 which, in the illustrative embodiment, comprises an elongated lever or handle 46 which projects radially from the stem part but is secured thereto by a conventional fastener such as a screw 47. The handle 46 has an inner sleeve or hub part 48 which surrounds and is nonrotatably keyed to the projecting end of the cylindrical stem 36. The handle also has an outer sleeve or cylinder part 49 which projects downwardly so as to externally surround the packing nut, with the lower end of this sleeve part 49 being rotatably telescoped over an annular hub or shoulder formed on the central body member 21.

While the illustrated actuator permits manual movement of the valve member between open and closed positions, it will be appreciated that numerous other types of conventional actuators could also be utilized. For example, both fluid and electrical operators of conventional construction could be connected to the valve stem 36 for effecting the desired rotatable movement between the open and closed positions.

Figure 6:
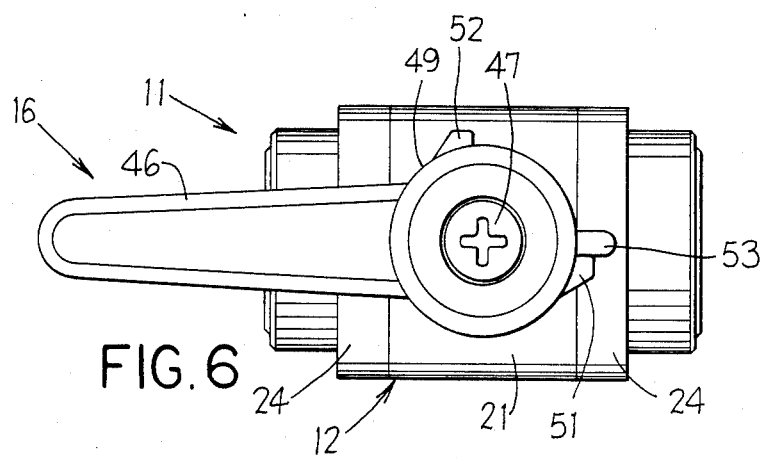
FIG. 6 is a top view of the valve as shown in FIG. 1.

To control the rotatable movement of the valve member and positively define the limits of rotation, namely the open and closed positions, the outer sleeve part 49 has a pair of tabs or stops 51 and 52 (FIG. 6) projecting radially outwardly from the periphery thereof, these stops having opposed stop surfaces spaced about 90° apart. These stops 51 and 52 are adapted to cooperate with a further stop 53 which is fixedly secured to and projects upwardly from the housing.

The valve assembly also includes a pair of identical end seals 61 which are supported within the annular end members 24 and project inwardly toward one another for sealingly and seatingly engaging the diametrically opposite sides of the ball member 31, these end seals 61 in effect defining therein the passage 14.

Each end seal 61 is formed substantially as a one-piece axially-elongated sleeve which, at the axially outer end thereof, defines an outer sleeve part 62 which is fixedly seated within the cylindrical passage 26. This sleeve part 62, adjacent an inner end thereof, is provided with an annular flange 63 which projects radially outwardly thereof, which flange projects behind and is supportingly engaged with a stepped shoulder 64 formed on the respective end member 24 so as to axially restrain the sleeve part 62 within the passage 26. The sleeve part 62 defines a threaded opening or port 66 projecting coaxially thereof, which opening 66 is coaxially aligned with the axis 33 and forms a part of the passage 14 which traverses the valve housing.

The end seal 61 also has, adjacent its axially inner end, an annular mounting flange 71 which has a generally rectangular or blocklike cross section. This flange 71 projects generally radially outwardly and is seatingly engaged within an annular groove 72 formed in the central body 21, which groove 72 projects outwardly from the central chamber 22 and axially inwardly from one of the end faces of the central body. This flange 71 abuts against an inner shoulder 73 which is formed on the central body and defines the inner axial face of the groove 72. Flange 71 also has a small annular rib 74 projecting axially therefrom into an undercut groove formed in the central body for radially lockingly securing the mounting flange 71 relative to the central body 21. This hence holds the flange 71 in substantially concentric relationship to the axis 33.

Figure 5:
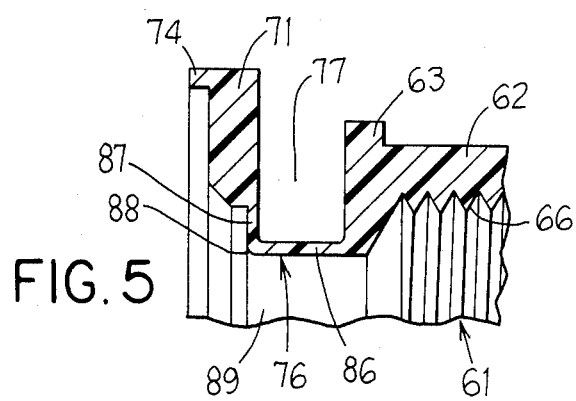
FIG. 5 is an enlarged fragmentary sectional view showing solely the axially inner portion of the end seal member.

The sleeve part 62 and annular flange 71 are normally axially spaced apart and are axially joined together by an annular bridging part 76, the latter being surrounded by a radially-outwardly opening annular groove 77 (FIG. 5) which is defined between the opposed axial end faces of the sleeve part 62 and mounting flange 71. This groove 77 accommodates therein, adjacent the radially outer portion thereof, an annular retainer ring 81 which is of generally L-shaped cross section, with this retainer ring being constructed of a stiff material. The retainer ring 81 is stationarily seated within the housing axially between the sleeve part 62 and mounting flange 71. For this purpose, the retainer ring 81 has a radially inner part 82 which is of substantially rectangular cross section and is axially interposed between and engaged with the opposed axial end faces of the sleeve part 62 and mounting flange 71 so as to effectively define a rigid axial structure. This inner part 82 in turn is integrally joined to a radially outer part 83 which is of lesser axial cross section, which outer part 83 is axially confined between the mounting flange 71 and a shoulder 84 formed on the housing, specifically on the end member 24. This retainer 81 hence coacts between the sleeve part 62 and the mounting flange 71 so as to ensure that the latter are respectively axially clampingly held between the housing shoulders 73 and 64.

With respect to the annular bridging part 76, it in effect comprises an axially elongated sleeve of thin radial wall thickness, the radial wall thickness of this bridging part 76 preferably being in the range of 0.020 to 0.024 inch, although this wall thickness may be somewhat lesser or greater than this dimensional range. The bridging part 76, when viewed in cross section, includes a substantially axially extending leg 86 which projects axially inwardly from the inner end of the sleeve part 62, with this axial leg 86 being integrally joined to a radially outwardly projecting leg 87 through a rounded corner 88, which radial leg 87 projects outwardly and joins to the mounting flange 71. This bridging part 76, specifically in the vicinity of the rounded corner 88 thereof, functions as a valve seat for sealingly and supportingly engaging the ball member 31. This annular bridging part 76 also defines therein a central passage 89 which is aligned along the axis 33 and projects inwardly from the port 66 so as to terminate substantially at the ball member. This passage 89 normally has a diameter which is only slightly greater than the diameter of the flow passage 32 through the ball member so as to result in the valve seats 88 contacting the ball member, when the latter is in a open position, in close proximity to the outer end of the flow passage 32 substantially as illustrated by FIG. 3.

The end seal 61 is constructed of a material which is resistant to high temperature and/or corrosive liquids such as chemicals, and which is also substantially impervious to the liquids flowing therethrough so as to prevent contamination problems. For this purpose, end seal 61 is constructed of a resin or plastics material which possesses these latter properties. At the same time, the annular bridging part 76 due to its thin wall must possess sufficient flexability or resiliency so as to permit it to be continuously maintained in snug, supportive and sealing engagement with the ball member. To achieve these objectives, the end seal 61 is preferably constructed of tetrafluorethylene (teflon).

To properly maintain the valve seat 88 in snug, supportive and sealing engagement with the ball member 31, there is provided a seat load ring 91 disposed within the radially inner end of the annular groove 77. This seat load ring 91 is hence confined within the groove 77 by means of the retainer ring 81, whereupon the seat load ring 91 hence is thus maintained in snug engagement with the outer peripheral wall of the annular bridging part 76 throughout the full extent thereof. The seat load ring 91 is of a generally rectangular cross section and is constructed of a material having at least limited resiliency, such as an elastomer, so as to exert a continual pressure against the exterior surface of the bridging part 76 so that, due to the thin and flexible wall thereof, the valve seat 88 will hence be continuously resiliently urged into snug sealing engagement with the ball member 31. Further, since the ball member is sealingly engaged by the annular resilient-acting valve seats 88 on diametrically opposite sides thereof, these valve seats 88 are hence capable of effectively supporting the ball member 31 and thus maintain it in a floating condition so as to always be properly centered and seated between the annular valve seats 88. The valve ball 31 hence is normally spaced out of engagement from the side wall defining the cylindrical chamber 22 as indicated by the clearance space appearing at 92.

In a preferred embodiment, the load ring 91 is constructed of an elastomer sold under the "Alcryn" tradename.

In addition to the end seal 61 being preferably constructed of Teflon as explained above, all of the other valve components are also preferably constructed of a rigid synthetic material having ability to resist high temperature and/or corrosive liquids. For this purpose, most of the components are hence constructed of Teflon or Ryton. For example, the central body 21, the ball member 31, the retainers 81, the cylindrical stem 36 and the packing 41 are all preferably constructed of Teflon. The end members 24 and the packing nut 42 are preferably constructed of Ryton.

OPERATION

While the operation of the valve assembly is believed apparent from the description set forth above, nevertheless same will be briefly described to ensure a complete understanding thereof.

When flow through the valve assembly is desired, then the valve member 13 is positioned as illustrated in FIGS. 2 and 3 so that the passage 32 through the ball member 31 is aligned with the flow passage 14 through the housing. When in this position, the ball member 31 is floatingly supported on and sealingly engaged with the opposed annular valve seats 88, the latter maintaining a slidable but resilient sealing engagement with diametrically opposite sides of the ball member due to the resilient backing provided by the seat load rings 91. The valve seats 88 sealingly engage the ball member on the external periphery thereof along a diameter which is only slightly greater than the end of the flow passage 32. Due to the support of the ball member 31 between the valve seats 88, the ball hence can move relative to the stem part 36 both axially and sidewardly as permitted by the slidable connection between the block 37 and groove 38, and at the same time the complete valve assembly can also move a limited extent along the stem axis 36 as permitted by the clearance 44, whereby the ball hence has limited floatability in all three dimensions so as to properly conform to the sealing support provided by the valve seats 88.

In addition, inasmuch as the valve seats 88 are an integral part of the bridging portions 86, which in turn are an integral part of the overall end seals 61 which are preferably formed of Teflon or other impervious and chemically resistant material, the valve can be utilized with high temperature corrosive liquids without encountering deterioration of the valve seats, and can also be utilized interchangeably with both pure and nonpure liquids since the valve seats will not absorb liquid and cause a cross-contamination problem. The overall configuration of the end seals 61 also positively retain the liquid within the valve assembly since, even if some of the liquid does happen to move radially outwardly past the valve seat 88, such as up into the area adjacent the mounting flange 71, nevertheless all of these components are still constructed of Teflon or similar material and hence do not experience any deterioration.

When flow through the valve is to be terminated, the valve member 13 will be manually rotated through an angle of about 90° about the axis 34, thus causing the opening 32 in the valve ball to extend transversely across the passage 14, whereupon the valve seats 88 will hence diametrically sealingly contac opposite solid portions of the ball and hence prevent flow through the valve assembly.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a ball valve assembly having a housing with a flow passage therethrough, a valve means movably mounted on the housing and cooperating with the passage for controlling flow therethrough, the valve means including a valve ball movably associated with said flow passage and having an opening extending centrally therethrough, and actuator means for swingably rotating said valve ball between an open position wherein said opening is aligned with said flow passage and permits flow therethrough and a closed position wherein the opening extends transversely relative to said flow passage, said valve ball being disposed between inlet and outlet portions of said flow passage, the improvement comprising:

inlet and outlet seal members mounted on said housing and respectively cooperating with the inlet and outlet portions of said flow passage, each of said seal members being constructed of a synthetic material which can withstand corrosive liquids;

each said seal member being of annular configuration and defining an opening therethrough which forms a part of said flow passage, each said seal member including a pair of annular relatively rigid mounting parts which are axially spaced apart and are fixedly mounted relative to the housing and are joined together by an axially-elongated sleevelike bridging portion which is of thin radial wall thickness so as to be flexible relative to the mounting parts, said sleevelike bridging portion defining a flexible annular wall part which defines an annular valve seat disposed in sliding and sealing engagement with said valve ball, said annular mounting parts defining an annular groove therebetween which externally surrounds said sleevelike bridging portion;

annular resilient means externally surrounding said annular bridging portion for causing the annular valve seat to be resiliently snugly engaged with the valve ball, said annular resilient means being sealingly isolated from said flow passage and comprising a resilient loading ring disposed within said annular groove and resiliently engaging the exterior annular surface of said sleevelike bridging portion; and a rigid retainer ring disposed within said annular groove in surrounding and confining relationship to said resilient loading ring, said retainer ring being axially rigidly engaged between the annular mounting parts of the respective seal member.

2. An assembly according to claim 1, wherein a first of said mounting parts comprises an axially elongated sleeve part which is rigidly mounted within the housing and defines a port which comprises a part of said flow passage and which is adapted to sealingly receive therein a conduit used for transporting the liquid, a second said mounting part being disposed axially inwardly from said first part so as to be positioned in close proximity to said ball, said second part being axially confined by said housing and positioned radially outwardly relative to said valve seat.

3. An assembly according to claim 2, wherein said seal members are identical, and wherein the valve seats defined on said seal members engage said valve ball on substantially diametrically opposite sides thereof.

4. An assembly according to claim 3, wherein said actuator means includes a value stem coupled to said valve ball and projecting outwardly therefrom for connection to an external actuator, said valve stem and said ball cooperating with one another and with said housing for permitting the ball to be floatably mounted in three perpendicular directions relative to said housing so that said valve ball is floatingly supported solely by said annular valve seats.

5. An assembly according to claim 3, wherein the port defined in said first mounting part is internally threaded to permit connection to a conduit.

6. An assembly according to claim 1, wherein said actuator means cooperates with said valve ball so as to permit the valve ball to floatingly move in three perpendicular directions relative to said housing so that the valve ball is solely floatably supported by said annular valve seats.

7. An assembly according to claim 6, wherein said pair of annular valve seats sealingly and supportingly engage said valve ball at substantially diametrically opposite sides thereof.

8. An assembly according to claim 1, wherein said first mounting part defines therein an internally threaded port which comprises a part of said flow passage for permitting the valve assembly to be coupled to a conduit.

9. An assembly according to claim 1, wherein the second mounting part is disposed in axially inwardly spaced relationship from and radially outwardly spaced relationship to said first mounting part, said annular bridging portion extending axially inwardly from said first mounting part and then radially outwardly for connection to said second mounting part so that the annular bridging portion defines a rounded corner intermediate its ends, said rounded corner defining said annular valve seat.

10. An assembly according to claim 1, wherein said valve ball and said said seal members are constructed of tetrafluorethylene.

11. In a ball valve assembly having a housing with a flow passage therethrough, a valve means movably mounted on the housing and cooperating with the passage for controlling flow therethrough, the valve means including a valve ball movably associated with said flow passage and having an opening extending centrally therethrough, and actuator means for swingably rotating said valve ball between an open position wherein said opening is aligned with said flow passage and permits flow therethrough and a closed position wherein the opening extends transversely relative to said flow passage, said valve ball being disposed between inlet and outlet portions of said flow passage, the improvement comprising:

inlet and outlet seal members mounted on said housing and respectively cooperating with the inlet and outlet portions of said flow passage, each of said seal members being constructed of a nonporous synthetic material which can withstand corrosive liquids;

each said seal member being of annular configuration and defining an opening therethrough which forms a part of said flow passage, each said seal member including a pair of annular mounting parts which are fixedly mounted relative to the housing and are joined together by an annular bridging portion which is of thin wall construction so as to be flexible, said annular bridging portion defining a flexible annular wall part which defines an annular valve seat disposed in sliding and sealing engagement with said valve ball;

said housing including a main body having a pair of retainer bodies fixedly secured to said main body on opposite sides thereof, said retainer and main bodies having said flow passage extending therethrough, each said seal member having a first said mounting part fixedly associated with one said retainer body and a second said mounting part fixedly held between said one retainer body and said main body; and annular resilient means externally surrounding said annular bridging portion for causing the annular valve seat to be resiliently snugly engaged with the valve ball, said annular resilient means being sealingly isolated from said flow passage.

12. An assembly according to claim 11, wherein the sleevelike bridging portion has a wall thickness in the range of about 0.020 to about 0.024 inch.

13. An assembly according to claim 9, wherein said first mounting part is formed substantially as an axially-elongated sleeve and defines therein an internally threaded port which comprises a part of said flow passage for permitting the valve assembly to be coupled to a conduit.

14. An assembly according to claim 1, wherein the sleevelike bridging portion has a wall thickness in the range of about 0.020 to about 0.024 inch.

15. An assembly according to claim 3, wherein the sleevelike bridging portion has a wall thickness in the range of about 0.020 to about 0.024 inch.

16. In a ball valve assembly having a housing with a flow passage therethrough, a valve means movably mounted on the housing and cooperating with the passage for controlling flow therethrough, the valve means including a valve ball movably associated with said flow passage and having an opening extending centrally therethrough, and actuator means for swingably rotating said valve ball between an open position wherein said opening is aligned with said flow passage and permits flow therethrough and a closed position wherein the opening extends transversely relative to said flow passage, said valve ball being disposed between inlet and outlet portions of said flow passage, the improvement comprising:

inlet and outlet seal members mounted on said housing and respectively cooperating with the inlet and outlet portions of said flow passage, each of said seal members being constructed of a nonporous synthetic material which can withstand corrosive liquids and relatively high temperatures;

each said seal member being of annular configuration and defining an opening therethrough which forms a part of said flow passage, each said seal member including a pair of annular relatively rigid mounting parts which are fixedly mounted relative to the housing and are joined together by an elongated sleevelike bridging portion which is of thin wall thickness so as to be radially flexible relative to said mounting parts, said sleevelike bridging portion defining a flexible annular wall part which defines an annular valve seat disposed in sliding and sealing engagement with said valve ball, the sleevelike bridging portion having a wall thickness in the range of about 0.020 to about 0.024 inch;

annular resilient means externally surrounding said sleevelike bridging portion for causing the annular valve seat to be resiliently snugly engaged with the valve ball, said annular resilient means being sealingly isolated from said flow passage by the respective seal member; and a first of said mounting parts as associated with each said seal member comprising an axially elongated sleeve part which is rigidly mounted within the housing and defines therein an elongated port which comprises a part of said flow passage, a second said mounting part as associated with each said seal member being disposed axially inwardly from said first mounting part and spaced therefrom by said sleevelike bridging portion, the port defined by said first mounting part having thread means for permitting a conduit to be directly sealingly engaged within said sleeve part so that the liquid being conveyed can be transported directly between the conduit and said first mounting part.

17. An assembly according to claim 16, wherein said seal members are constructed of tetrafluorethylene.

* * * * *

UNITED STATES PATENT AND TRADEMARK OFFICE
CERTIFICATE OF CORRECTION

PATENT NO. : 4 725 042

DATED : February 16, 1988

INVENTOR(S) : Jammie L. MASON

It is certified that error appears in the above-identified patent and that said Letters Patent is hereby corrected as shown below:

Column 9, Line 40; Change "Claim 1" to ---Claim 11---.

Column 9, Line 45; Change "Claim 1" to ---Claim 11---.

Signed and Sealed this

Twenty-fifth Day of October, 1988

Attest:

DONALD J. QUIGG

Attesting Officer

Commissioner of Patents and Trademarks